UNITED STATES PATENT OFFICE.

HEINRICH AUGUST BERNTHSEN, OF MANNHEIM, ASSIGNOR TO THE BADISCHE ANILIN AND SODA FABRIK, OF LUDWIGSHAFEN, GERMANY.

RED RHODAMIN DYE.

SPECIFICATION forming part of Letters Patent No. 516,585, dated March 13, 1894.

Application filed June 15, 1893. Serial No. 477,706. (Specimens.)

*To all whom it may concern:*

Be it known that I, HEINRICH AUGUST BERNTHSEN, professor of chemistry, doctor of philosophy, and a subject of the King of Prussia, residing at Mannheim, Germany, have invented new and useful Improvements in a New Red Rhodamin Dye, of which the following is a specification.

My invention relates to the manufacture of a new red rhodamin dye which is obtained by converting new mono-alkylated amidocresols into dialkylated homo-rhodamins and finally converting these dialkylated homo-rhodamins into my new red basic dye. In this present application I make no claim to the said new mono-alkyl-amido-cresols or to the new dialkyl-homo-rhodamins. The said new mono-alkylated amidocresols are obtained from mono-alkylated ortho-toluidins, which are first converted into sulfo-acids by treatment with fuming sulfuric acid, whereby mono-alkyl-ortho-toluidin-para-sulfo-acids are obtained. The next step consists in melting these sulfo-acids or rather their alkaline salts with a caustic alkali, so as to convert them into the corresponding mono-alkyl-ortho-amido-para-cresols.

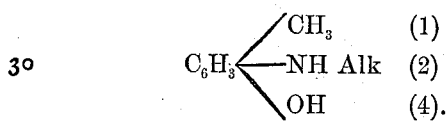

In these compounds the amido- and hydroxyl-groups are in the meta-position to one another and I have found that the bodies can be used in the preparation of new rhodamin-dyes. The conversion into these dyes which are symmetrical dialkylated homo-rhodamins, is effected by condensation with phthalic anhydrid. The new rhodamins so obtained are higher homologues of those described in the German Patent No. 48,731. Finally by treating the new symmetrical dialkylated homo-rhodamins with a further proportion of an alcohol radical, my new basic rhodamin dye is obtained.

The following examples illustrate the manner in which my invention can be carried into practical effect. The parts are by weight.

*Example* I. *Production of a new mono-alkyl-ortho-toluidin-para-sulfo-acid.*—Mix about ten parts of mono-ethyl-ortho-toluidin with about twenty parts of fuming sulfuric acid containing about twenty three per cent. free anhydrid, taking care that the temperature at no time exceeds about 60° centigrade. Next while still carefully cooling, add about thirty parts of fuming sulfuric acid, containing about seventy per cent. free anhydrid. Allow the mixture to stand at a temperature of from 40° to 70° centigrade till a test portion is completely soluble in alkaline water; then pour the whole into ice. The greater part of the new sulfo-acid usually separates out directly in the crystalline form. Convert into the sodium salt in the usual way.

In the above example instead of mono-ethyl-ortho-toluidin other mono-alkyl-derivaties can be used, in particular the mono-methyl-ortho-toluidin. The process is effected in a similar manner and practically the same result is obtained.

*Example* II. *Production of the mono-alkylated-amido-cresols.*—Melt together about one part of the sodium salt of mono-ethyl-ortho-toluidin-para-sulfo-acid with about two to three parts of caustic potash, excluding the air as far as practicable. Maintain the temperature at from 220° to 260° centigrade for a few hours until practically no sulfo-acid remains unchanged. This can be ascertained thus, dissolve test portions of the melt in acidified water, saturate with soda, extract well with ether and then treat the aqueous solution with a diazo compound; the formation of an azo-compound proves that sulfo-acid is still present. When the melting operation is ascertained to be complete, dissolve the melt in water, acidify with hydrochloric acid and filter. Saturate the solution with soda and extract the mono-ethyl-ortho-amido-para-cresol with ether or benzene. Evaporate the solvent. The desired compound is thus obtained as a stiff oil, which on standing begins to solidify and can be crystallized from a mixture of benzene and ligroin. The mono-methyl or other mono-alkyl-compounds can be similarly obtained by using the corresponding sulfo-acid. Caustic soda can be used instead of caustic potash in the melt.

*Example* III. *Production of the new di-*

*alkyl-homo-rhodamins.*—Mix together about ten parts of mono-ethyl-ortho-amido-para-cresol, ten parts of phthalic anhydrid and about five parts of zinc chlorid and melt the mixture in an enameled pot excluding the air as far as practicable. Maintain the temperature at about 170° to 200° centigrade for about an hour or until the melt shows a tendency to solidify. When cold reduce to powder, wash well with water to extract zinc chlorid, then mix the residue well with an excess of dilute caustic soda solution and digest for twenty four hours. Collect the homo-rhodamin base thus obtained on the filter, wash and dry. The base can be converted into its hydrochlorid by dissolving in concentrated hydrochloric acid and pouring out into not too much water. Other dialkyl homo-rhodamins and in particular the dimethyl-compound can be obtained in the same way from the corresponding mono-alkyl-amido-cresol.

*Example IV. Preparation of the new dye.*—Dissolve about one part of symmetrical di-ethyl-homo-rhodamin in about five parts of ethyl- or methyl-alcohol and pass a current of dry hydrochloric acid gas through the solution till it is saturated. The formation of the new dye takes place already in the cold but practically it is best to heat the mixture. For this purpose fit the containing vessel with an inverted or reflux condenser and heat on the water-bath. Continue to pass the hydrochloric acid gas slowly through the boiling solution. Continue this treatment for about five hours or until no further conversion of the di-ethyl-homo-rhodamin into the new dye takes place.

To isolate the new dye distill off the alcohol and hydrochloric acid on the water-bath. Dissolve the residue in hot water and filter the hot solution if it be not clear. On cooling the new dye separates out in the crystalline form; its more complete separation can be obtained by adding common salt. Filter, press and dry at low temperature. Instead of applying gaseous hydrochloric acid in the above example, concentrated sulfuric acid may be mixed with the alcoholic solution of the homorhodamin before heating on the water bath. Similarly other alcohols such as methyl and amyl-alcohol and glycerol can be used in the same way.

My new dye can also be obtained by using other dialkyl-homo-rhodamins and especially the dimethyl-homo-rhodamin and by alkylating in other well known ways such as by treating with alkyl-halogen compounds. It fixes itself on cotton mordanted with tannin giving very beautiful bright shades of red possessing a high degree of fastness.

My new dye possesses the following characteristic properties: It is readily soluble in water giving red highly fluorescent solutions. On boiling with caustic alkalies it is converted into the dialkyl-homo-rhodamin from which it was obtained, it is soluble in dilute hydrochloric acid which affords a ready means of distinguishing it from the dye less soluble in this solvent prepared from the lower homologous rhodamin, and which is described in an application for patent filed by me June 12, 1893, Serial No. 477,318. This test is best effected as follows: To a solution of one part dye in one thousand parts water is added about one twentieth its volume of hydrochloric acid (containing about thirty per cent. real acid HCl). On standing during a quarter of an hour the solution of my new dye of this present application remains practically clear, while a similar solution of the lower homologous dye above referred to soon deposits a crystalline precipitate consisting of fine needles.

My new dye is chemically a dialkyl-homo-rhodamin-alkyl-ester and possesses the formula—

$$C_{22}H_{13}O_2(OR')(NHR)_2HCl,$$

where R means ethyl or methyl and R' the introduced alkyl-group.

What I claim as new, and desire to secure by Letters Patent, is—

1. The new dye herein before described which can be derived from a dialkyl-homo-rhodamin being chemically a dialkyl-homo-rhodamin-alkyl-ester which is readily soluble in water giving red and strongly fluorescent solutions, soluble in dilute hydrochloric acid and which is converted by boiling with caustic alkalies into the corresponding dialkyl-homo-rhodamin, all substantially as described.

2. The process for the manufacture of a new red rhodamin dye consisting in preparing a mono-alkyl-ortho-toluidin-sulfo-acid by sulfonation of mono-alkyl-ortho-toluidin, and converting this sulfo-acid into mono-alkyl-meta-amido-cresol by melting with a caustic alkali, then obtaining therefrom dialkyl-homorhodamin by heating with phthalic anhydrid and zinc chlorid and finally alkylating the dialkyl homorhodamin by treatment with alcohol and either hydrochloric or sulfuric acid, substantially as herein before described.

In testimony whereof I have hereunto set my hand in the presence of two subscribing witnesses.

HEINRICH AUGUST BERNTHSEN.

Witnesses:
ERNEST F. EHRHARDT,
ADOLPH REUTTINGER.